Nov. 21, 1933.   H. A. BLANCHARD   1,935,934
ANTISIPHON TRAP
Filed Nov. 13, 1930   3 Sheets-Sheet 1
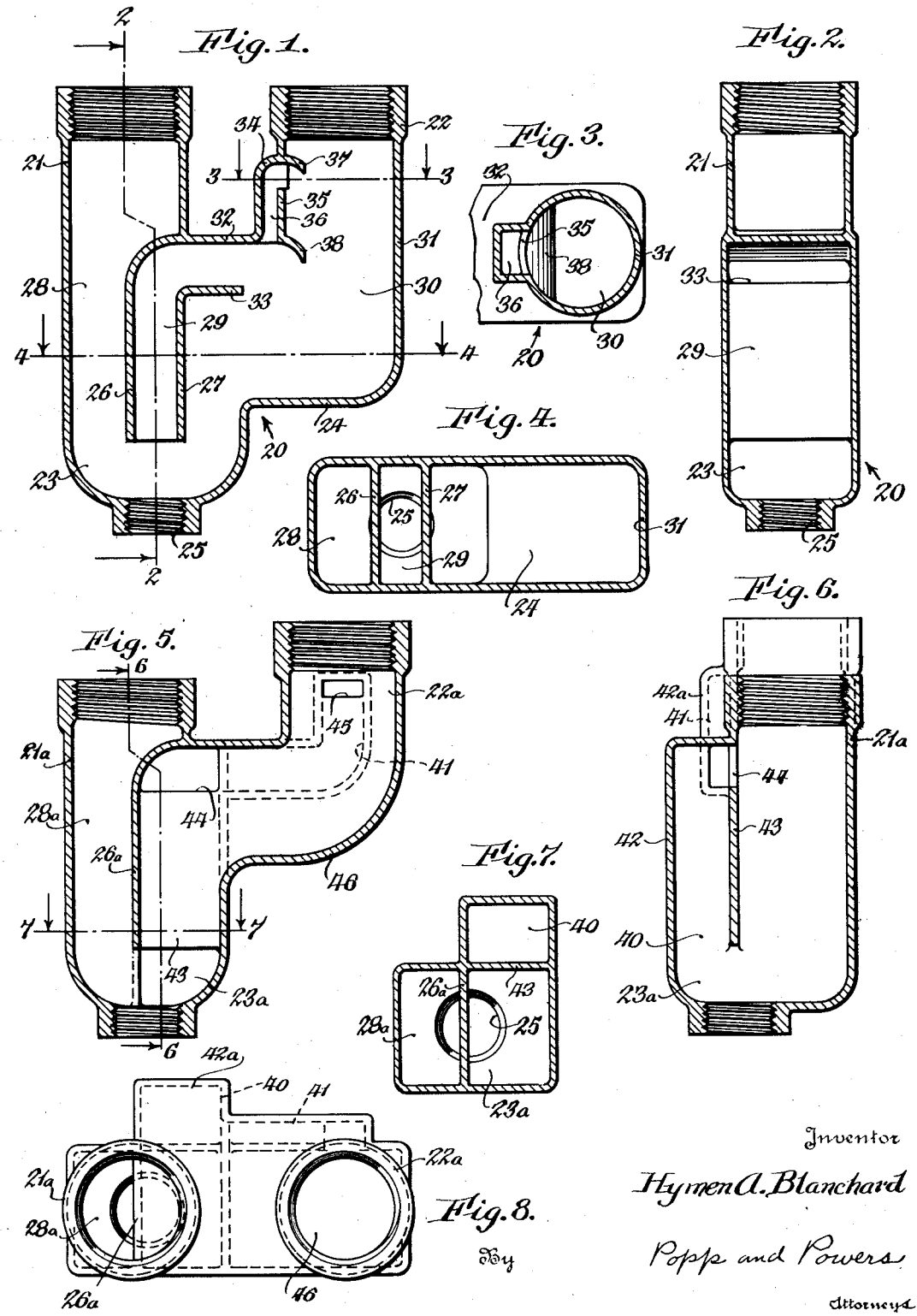
Inventor
Hymen A. Blanchard
By Popp and Powers
Attorneys Nov. 21, 1933.  H. A. BLANCHARD  1,935,934
ANTISIPHON TRAP
Filed Nov. 13, 1930  3 Sheets-Sheet 2
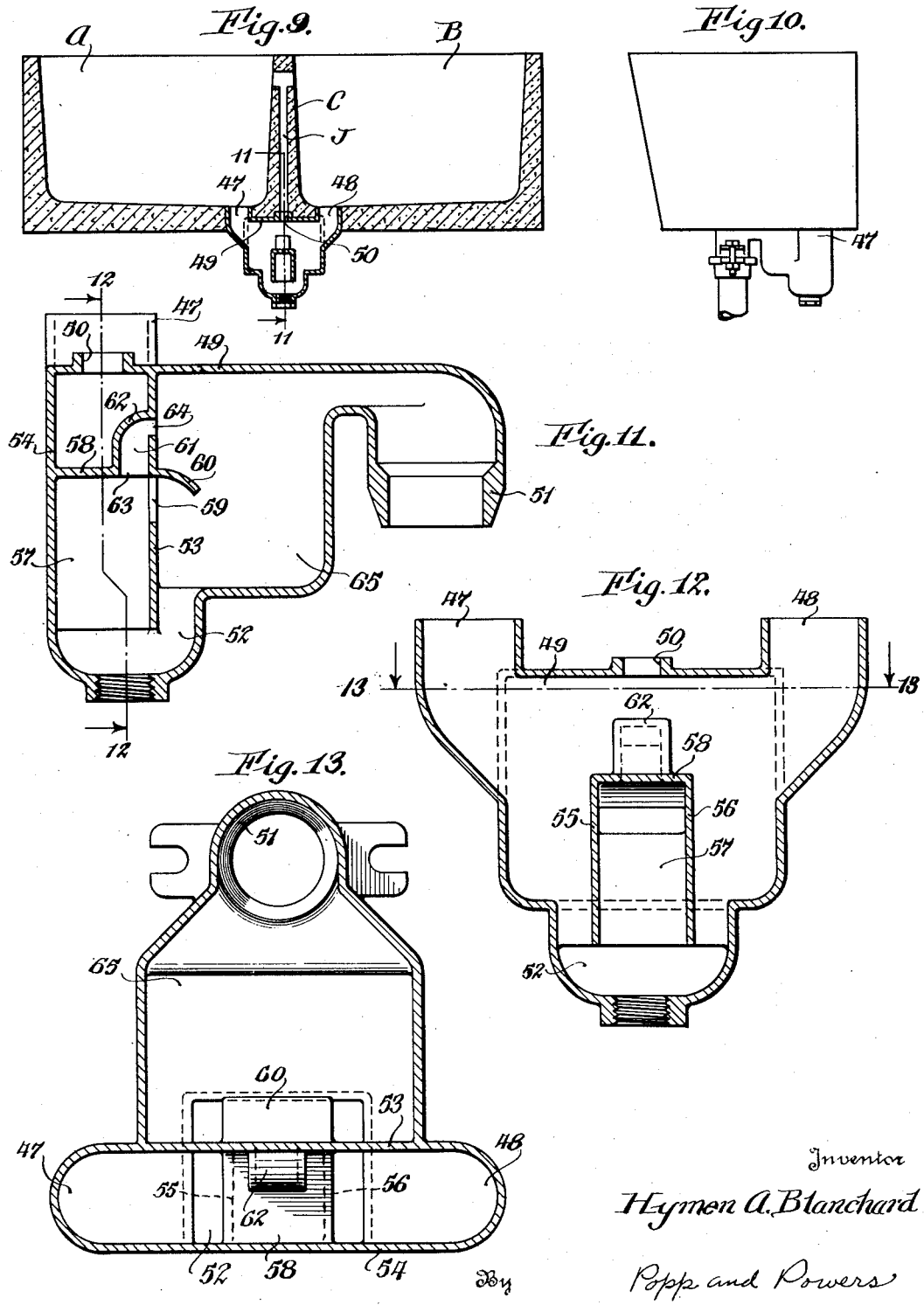

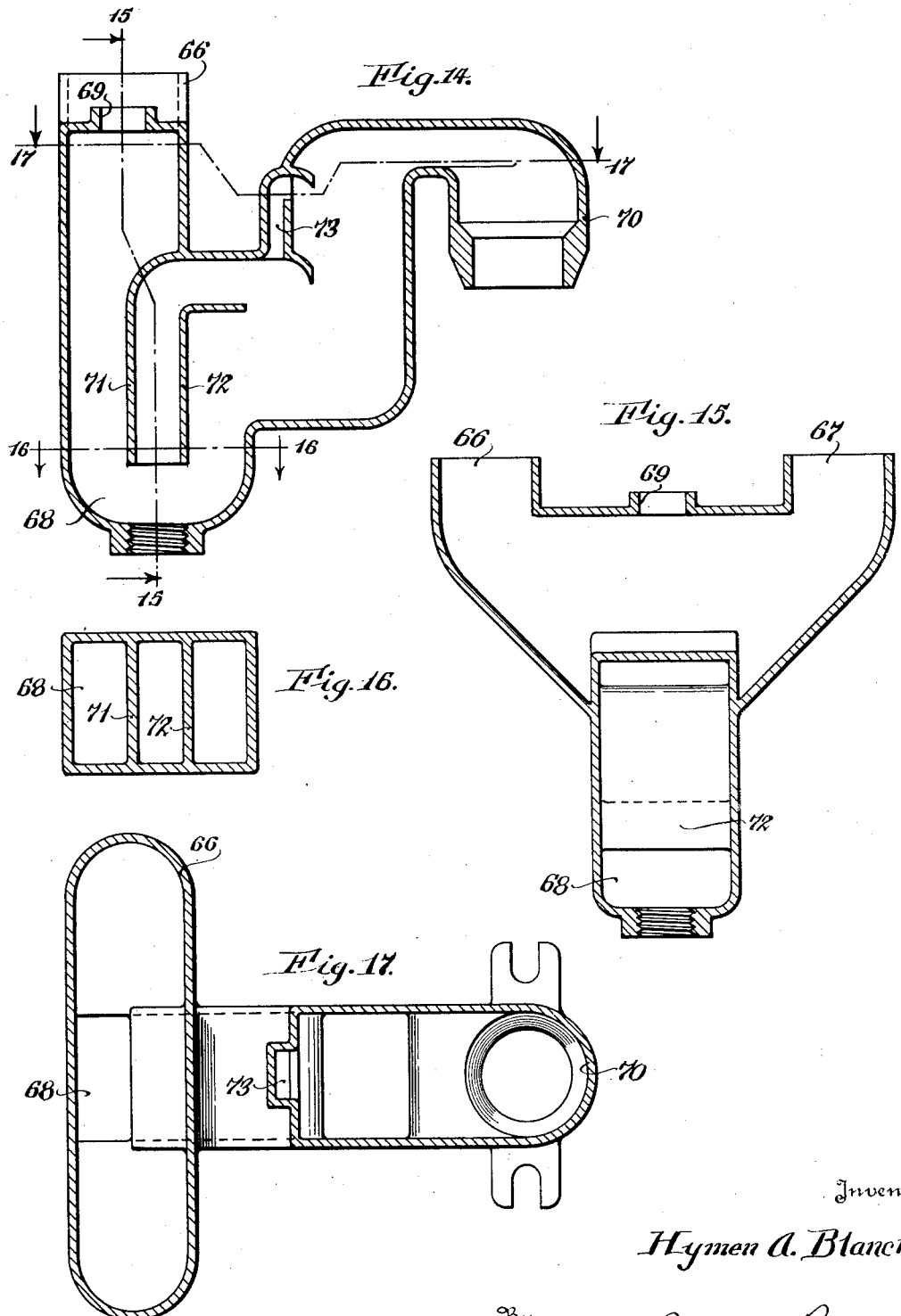

Patented Nov. 21, 1933

1,935,934

UNITED STATES PATENT OFFICE 1,935,934

ANTISIPHON TRAP

Hymen A. Blanchard, Buffalo, N. Y.

Application November 13, 1930
Serial No. 495,354

4 Claims. (Cl. 182—12)

This invention relates to an anti-siphon trap which is designed to maintain, under all conditions, a permanent seal between the fixture with which the trap is associated and the waste pipe to which the fixture is connected without the necessity of auxiliary venting means.

One object of the invention is a trap of the kind described in which the body of liquid which forms the seal is maintained at a constant predetermined level under all conditions of use.

A further object is a trap which is designed to prevent the escape of the liquid in the form of a spray or mist, thereby avoiding diminution in this manner of the body of liquid which forms the seal.

A still further object is a trap which is available as a combined drainage and trap fitting for use in connection with laundry trays, the fitting when utilized in this connection being partially embedded in the bottom of the tray when the latter is cast.

The invention is illustrated in the accompanying drawings, in which:

Figure 1 is a vertical sectional view of a trap constructed in accordance with the invention.

Figure 2 is a section taken along line 2—2 of Fig. 1.

Figure 3 is a fragmentary sectional view taken along line 3—3 of Fig. 1.

Figure 4 is a section taken along line 4—4 of Fig. 1.

Figure 5 is a modified form of the trap.

Figure 6 is a vertical section taken along line 6—6 of Fig. 5.

Figure 7 is a section taken along line 7—7 of Fig. 5.

Figure 8 is a top view of the modified form of trap.

Figure 9 is a longitudinal vertical section of a two compartment laundry tray showing a fitting embodying my invention embedded in the bottom thereof.

Figure 10 is an end elevation of the same.

Figure 11 is a section taken along line 11—11 of Fig. 9, the tray being omitted.

Figure 12 is a section taken along line 12—12 of Fig. 11.

Figure 13 is a section taken along line 13—13 of Fig. 12.

Figure 14 is a fitting also designed for use in connection with a two-compartment tray, which fitting is a modified form of the trap shown in Figure 1.

Figure 15 is a section taken along line 15—15 of Fig. 14.

Figure 16 is a section taken along line 16—16 of Fig. 14.

Figure 17 is a section taken along line 17—17 of Fig. 14.

The trap illustrated in the accompanying drawings is available for use in connection with various plumbing fixtures and is also available as a combination waste and trap fitting for laundry trays which are formed with a plurality of compartments.

In the embodiment shown in Figure 1, the trap comprises a hollow body 20 of suitable form provided with an inlet extension or pipe 21 and an outlet extension or pipe 22, the former being adapted for connection to the outlet of the fixture with which the trap is associated and the latter being intended for connection with the waste pipe by which the fixture is drained.

The trap is formed at its bottom with a well 23 through which liquid from the inlet extension 21 passes as it moves toward the outlet extension 22, it being noted that the latter is offset with respect to the well 23 and is connected to the well by a laterally extending bottom wall 24. A threaded opening 25 is formed in the body of the trap for cleaning purposes, which opening may be closed in any convenient manner.

The interior of the trap is divided by partitions 26 and 27 into chambers 28, 29 and 30 which will be hereinafter referred to as the inlet chamber, vent passage and outlet chamber, respectively. The partitions extend downwardly into the well 23 a substantial distance below the bottom wall 24 of the trap body. It will be apparent that by virtue of the partitions a path is defined whereby the liquid passing through the trap is compelled to flow down into and out of the well 23 as it moves toward the outlet extension 22. It will also be apparent that in order to maintain an adequate seal between a fixture with which the trap is associated and the waste pipe by which the fixture is drained, only enough liquid remain in the trap to fill the well 23. Thus, by holding this amount of liquid in the trap an effective seal may be maintained, the height of which, of course, depends upon the distance the partitions 26 and 27 extend into the well.

At its upper extremity, the course of the vent passage 29 is changed to extend horizontally toward the end wall 31 of the trap body by the top wall 32 of the body and a lateral extension 33 of the partition 27. Adjacent the outer end of the vent passage 29, the outlet extension 22 of the trap is formed with a hollow rib 34 which provides with the rear wall 35 of the said extension a second vent passage 36, the latter, by virtue of the relatively short extension 33 of the partition 27 being in communication both with the vent passage 29 and the chamber 30. The rib 34 and the rear wall 35 of the pipe extension 22 are formed to extend inwardly into the passage provided by the said extension to form deflectors 37 and 38 respectively which are designed to direct downwardly any liquid which impinges against them.

During the drainage of the fixture with which the trap is associated, the liquid from the fixture passes through the inlet extension 21 downwardly into the well 23 and from the latter a portion of the liquid passes through the vent passage 29 while the remainder passes into the outlet chamber 30. A portion of the liquid passing through the vent passage 29 is directed downwardly by the deflector 38 into the outlet chamber while the remainder passes upwardly through the second vent passage 36 and is also directed by the deflector 37 downwardly toward the bottom of the said chamber. This action continues until the fixture is emptied and air is admitted into the bottom of the vent passage 29 of the trap, this air being utilized to prevent siphoning, in the manner to be described, from the trap of the liquid which is to form the seal.

At the instant the body of liquid in the inlet chamber 28 reaches the lower edge of the partition 26, the greater part of the well, the vent passages and the outlet chamber are filled with liquid. As the siphoning action continues air admitted through the inlet pipe 21 passes beneath the edge of the partition 26 up into the vent passage 29. The air is directed outwardly by this passage toward the end wall 31 of the trap. However, when it reaches the second vent passage 36 a greater part of it rises through this passage and is directed out into the outlet extension 22. It will thus be apparent that a quantity of air has been by-passed around a portion of the liquid in the outlet chamber 30 and that as the vacuum is broken, that portion of the liquid flows by gravity toward and into the well 23 to fill the same whereby communication between the inlet pipe 21 either through the vent passage 29 or the opening into the outlet chamber, is prevented. The trap is designed so that a sufficient quantity of liquid is retained in the trap to completely fill the well 23, that is to say at least to the top of the bottom wall 24.

Not only is the liquid which is to form the seal subjected to a siphoning action during the drainage of the fixture with which the trap is associated, but it may be subjected to similar actions during the drainage of other fixtures which are connected in the same system. Thus, as bodies of water from other fixtures in the system above it are discharged into the same waste pipe and rush by the outlet opening of the pipe with which the trap is in communication with the waste pipe a vacuum is created in the discharge line between the waste pipe and the trap, hence the air admitted through the inlet pipe 21 acts against the liquid in the well 23 and tends to force it out of the same. In this connection it is understood, of course, that the creation of a vacuum in the manner described is practically instantaneous and, therefore, the resultant action of the air upon the liquid in the well 23 is also instantaneous. After a vacuum is created in the discharge line in the manner described, the liquid in the inlet chamber 28 portion of the well is forced downwardly toward the lower edge of the partition 26 as described heretofore. As this occurs, a portion of the liquid in the well is forced up through the vent passage 29 while a portion is forced up and flows outwardly into the outlet chamber 30. As the air is admitted into the vent passage 29, it passes upwardly and around the small portion of liquid which by this time has spread out upon the bottom wall 24 and enters the second vent passage 36 from whence it passes out into the outlet pipe 22. The air passes through the trap as described with great rapidity and would, unless otherwise prevented, carry with it in the form of mist or spray a portion of the liquid from the well 23. As the number of siphoning actions to which the fixture is subjected between fillings, may be numerous, the removal of a small quantity of liquid in this manner during each siphoning action would in a short time result in breakage of the seal. The deflectors 37 and 38 function, as the air passes rapidly upwardly and outwardly through the fixture, to remove from the air the water which is carried by it and return the same to the bottom of the trap where it flows by gravity back into the well 23. As the air reaches and passes through the second inlet passage 36 a large part of the water carried thereby has been removed by the deflector 38. The purpose, therefore, of the deflector 37 is to remove the remainder of the water and the air as it passes upwardly through the outlet extension 22 is substantially dry.

It will be apparent that the well 23 which contains the liquid seal is relatively small and hence requires only a small quantity of liquid for its filling. It will be understood, of course, that the well 23 will be seldom, if at all, entirely emptied as before this occurs, a sufficient quantity of air will have passed into the vent passage 29. In other words, the outlet chamber 30 serves its purpose as long as it holds in the trap a quantity of liquid sufficient to fill the well 23 to such a height as to provide the desired seal.

A modified form of trap is shown in Figures 5, 6, 7 and 8. In this embodiment, the vent passages described heretofore in connection with Figure 1 are eliminated from the interior of the trap in order to facilitate the passage of waste water therethrough without possibility of the accumulation of solid materials. To this end, by-passes 40 and 41 are provided by a hollow rib 42 which is formed upon a side wall 43 of the trap body. The wall 43 at this point extends, as does the partition 26a which forms the inlet chamber 28a of the trap, below the bottom wall 46 of the outlet chamber into the well 23a. The by-pass 40 at its lower extremity is in communication with well 23a. The side wall 43 of the body is cut away as at 44 to form an opening through which the by-pass 40 is in communication with the outlet chamber. From this point on, the rib 42 is reduced as at 42a and the by-pass 41 provided thereby is correspondingly reduced, the by-pass at its lower extremity being in communication with the by-pass 40 and at its upper extremity being in communication with the outlet extension of the trap through an opening 45.

In this embodiment, it is to be noted that the bottom wall 46 of the outlet chamber is raised relatively to the bottom wall 24 of the trap shown in Figure 1. In the latter figure, the vent passages 29 and 36 and the rib 27 by which the vent passage is formed utilize a portion of the space within the trap thereby necessitating the lower bottom wall. On the other hand, in the embodiment shown in Figure 5, the vent passages being formed upon the body of the trap, the increased spacing made available by this construction enables the raising of the lower bottom wall 46 in the manner shown. This embodiment has the advantage that the main passageway between the inlet pipe and the outlet pipe is substantially clear of any obstructions and hence the accumulation of waste matter in the trap is avoided. In connection with this embodiment, it will be noted that the passages 40 and 41 have been referred to as by-passes as distinguished from vent passages referred to with respect to Figure 1. This is for the reason that communication between the inlet and outlet chambers is more direct than the communication between the inlet chamber and the by-passes. Hence, in this construction, the air which passes beneath the lower edge of the partition 26a passes directly through the outlet chamber instead of through the by-passes. These by-passes, therefore, serve to hold a quantity of liquid in the trap which with the liquid remaining in the well is sufficient to provide a seal of the necessary height.

In Figures 9, 10, 11, 12, and 13, a fitting embodying my invention is shown designed for use in connection with a laundry tray formed with a plurality of compartments. When employed in this manner the fitting is embedded in the tray when cast. As illustrated, a tray having two compartments A and B is cast as a unit, the compartments being separated by the partition C. The fitting, as illustrated, is partially embedded in the tray beneath the partition C. It includes two drainage arms 47 and 48. The said arms extend to either side of the partition C, the arm 47 being in communication with the compartment A while the arm 48 is in communication with the compartment B. The partition C is provided with an overflow passage J which opens into both of the compartments. The top wall 49 of the fitting is formed with an opening 50 and the overflowing passage J is in communication with the fitting through the said opening. The top wall 49 of the fiting extends outwardly and downwardly to provide a discharge nipple 51 by which the fitting may be connected to the waste pipe. The drainage arms 47 and 48 and the overflow passage J are in communication with a well 52 formed upon the bottom of the fitting. The latter is also formed with a partition 53 which extends from the top wall 49 down into the well 52, the distance that the partition 53 extends into the well determining, of course, the height of the seal. In this embodiment, the vent passages are formed between the outer wall 54 and the partition 53. For this purpose, connecting walls 55 and 56 are formed between the said wall and partition to delimit a vent passage 57 which is in communication with the well 52, it being noted that the lower edges of the side walls 55 and 56 lie in the same plane as the lower edge of the partition 53. The said passage includes a top wall 58. Adjacent the top wall, the partition 53 is formed with an outlet opening 59. At the upper limit of this opening, the partition 53 is formed to extend outwardly as at 60 to provide a downwardly curved deflector 60. A second vent passage 61 is provided by a hollow rib 62, the said passage being in communication with the first passage through an opening 63 formed in the top wall 58 of the first vent passage and in communication with the outlet chamber of the fitting through an opening 64 formed in the partition 53.

From the foregoing, it will be apparent that any liquid which enters the fitting through the arm 47 or 48 or the drainage passage J passes downwardly between the walls 53 and 54 around the vent passages into the well 52. From the well 52, a portion of liquid passes up through the vent passage 57 while the remainder passes directly into the outlet chamber 65. The vent passages 57 and 61 function in substantially the same manner as the vent passages described in connection with Figure 1, that is to say they provide a by-pass whereby when the water in the fitting has been lowered to a predetermined level air is admitted to the vent passage 57 and by-passed around a body of liquid contained in the outlet chamber 65 so that this liquid may be utilized to provide a seal.

In Figures 14, 15, 16 and 17, a fitting is shown for a purpose similar to the one just described. In this embodiment it will be noted that the fitting is in many respects similar to the trap shown in Figure 1, the changes in construction being made to enable the use of this form of trap in connection with laundry trays.

As shown, the fitting includes a pair of drainage arms 66 and 67 which converge in the direction of their bottoms towards the well 68. This fitting, as in the embodiment of the one just described, includes an opening 69 through which any overflow from the compartments of the tray with which the fitting is associated may enter the fitting, any such liquid, of course, being directed to the well 68. The fitting is formed with downwardly extending nipple 70 to enable its connection with the waste pipe. Partitions 71 and 72 divide the interior of the fitting into a plurality of chambers, e. g. inlet chamber, a vent passage and an outlet chamber, the partitions extending down into the well 68. The fitting is also formed with a second vent passage 73, the inlet chamber, the two vent passages and the outlet chamber being similar in construction to and functioning as the corresponding parts described in connection with Figure 1.

Having fully described my invention, I claim:

1. An anti-siphon trap comprising a body formed with a well, means for dividing the interior of said body into an inlet chamber, a vent passage and an outlet chamber, said means extending into said well below the bottom wall of said outlet chamber, whereby the inlet chamber is sealed from said vent passage and said outlet chamber by the liquid in said well, and a second vent passage beyond said first mentioned passage through which the air leaving said first mentioned passage is directed past said outlet chamber.

2. An anti-siphon trap comprising a body formed with a well, means for dividing the interior of said body into an inlet chamber, a vent passage and an outlet chamber, said means extending into said well below the bottom wall of said outlet chamber, whereby the inlet chamber is sealed from said vent passage and said outlet chamber by the liquid in said well, a second vent passage beyond said first mentioned passage through which the air leaving said first mentioned passage is directed, and means adjacent the entrance of said second vent passage for directing the liquid carried by said air toward the bottom of said trap.

3. An anti-siphon trap comprising a body formed with a well, means for dividing the interior of said body into an inlet chamber, a vent passage and an outlet chamber, said means extending into said well below the bottom wall of said outlet chamber, whereby the inlet chamber is sealed from said vent passage and said outlet chamber by the liquid in said well, a second vent passage beyond said first mentioned vent passage through which the air leaving said first mentioned vent passage is directed, and means adjacent the discharge end of said second vent passage for directing the liquid carried by the air passing therethrough downwardly toward the bottom of the trap.

4. An anti-siphon trap comprising a body formed with a well, means for dividing the interior of the trap into an inlet chamber, a vent passage and an outlet chamber, said means extending into said well below the bottom wall of said outlet chamber, whereby the inlet chamber is sealed from said vent passage and said outlet chamber by the liquid in said well, means adjacent the discharge end of said passage for deflecting the liquid carried by the air passing therethrough toward the bottom of the trap, a second vent passage beyond said first mentioned vent passage and through which the air leaving said first mentioned passage is directed, and means adjacent the discharge end of said second vent passage for deflecting the liquid carried by the air passing through the same toward the bottom of the trap.

HYMEN A. BLANCHARD.